United States Patent [19]

Tausworthe et al.

[11] 4,148,031

[45] Apr. 3, 1979

[54] PHASE CONJUGATION METHOD AND APPARATUS FOR AN ACTIVE RETRODIRECTIVE ANTENNA ARRAY

[76] Inventors: James C. Fletcher, Administrator of the National Aeronautics and Space Administration, with respect to an invention of Robert C. Tausworthe, Pasadena; Ralph C. Chernoff, Los Angeles, both of Calif.

[21] Appl. No.: 777,983

[22] Filed: Mar. 16, 1977

[51] Int. Cl.[2] .............................................. H04B 7/00

[52] U.S. Cl. .............................................. 343/100 TD

[58] Field of Search ................. 343/100 SA, 754, 854, 343/100 TD

[56] References Cited

U.S. PATENT DOCUMENTS

| | | | |
|---|---|---|---|
| 3,259,902 | 7/1966 | Malech | 343/777 |
| 3,305,864 | 2/1967 | Ghose | 343/100 TD |
| 3,350,642 | 10/1967 | Stahler | 343/100 TD |
| 3,422,438 | 1/1969 | Marston | 343/854 |
| 3,611,381 | 10/1971 | Preikschat et al. | 343/100 TD |
| 3,757,334 | 9/1973 | Raabe | 343/100 TD |
| 3,789,417 | 1/1974 | Coleman | 343/854 |
| 3,803,618 | 4/1974 | Coleman | 343/754 |

*Primary Examiner*—Theodore M. Blum
*Attorney, Agent, or Firm*—Monte F. Mott; John R. Manning; Paul F. McCaul

[57] ABSTRACT

An active retrodirective antenna array wherein a reference array element is used to generate a phase reference which is replicated at succeeding elements of the array. Each element of the array is associated with a phase regeneration circuit and the phase conjugation circuitry of an adjacent element. In one implementation, the phase reference circuit operates on the input signal at the reference element, a voltage controlled oscillator (VCO) output signal and the input pilot signal at the next array element received from a transmission line. By proper filtering and mixing, a phase component may be produced to which the VCO may be locked to produce the phase conjugate of the pilot signal at the next array element plus a transmission line delay. The same phase conjugation process occurs at the next element where the proper phase reference is regenerated by mixing samples of the input pilot and transmitted signal. In another implementation, particularly suited for large arrays in space, two different input pilot frequencies are employed. Their difference is the phase reference of the system, and a local oscillator is used in obtaining this difference, which is in the IF range. The two pilot frequencies are selected in accordance with particular criteria to insure proper phase addition and elimination of local oscillator components. Appropriate mixing and filtering is performed to achieve phase conjugation and phase reference replication.

24 Claims, 6 Drawing Figures

PHASE CONJUGATION METHOD AND APPARATUS FOR AN ACTIVE RETRODIRECTIVE ANTENNA ARRAY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

The subject invention is directed to antenna arrays and more particularly to a method and means for phasing the elements of active retrodirective antenna arrays.

An active retrodirective array (ARA) is an antenna array which automatically steers its transmitted beam towards the apparent source of an incoming pilot signal. The modifier "active" means that the radiated power is generated by sources associated with the antenna, rather than by reflection of an incident signal as in a passive retrodirective antenna (e.g., corner reflector).

Such arrays, which are also known as "self-focusing" arrays, have been suggested for some time. In such arrays, the transmitted wavefront duplicates the incoming pilot signal wavefront whatever its shape. The self-focusing property is important because it means that the transmitted power is focused back on the pilot source whatever the state of the intervening propagation medium, provided that the state persists for the round trip light time. Though not yet in practical use, ARA's are expected to become an important part of phased array technology. They have, for example, been proposed for microwave power-transmission from orbiting solar power stations, communication satellite transmitting arrays, and aircraft transponders.

The retrodirective properties of proposed ARA's is achieved by "conjugating" a pilot signal incident at each array element $E_i$. At time t, an array element $E_i$ receives a pilot signal phase of the form $$\phi_{pi}=\omega t-\beta r_i$$

where $r_i$ is the distance from the pilot source to the $i^{th}$ array element and $\beta=\omega/v$ where v=the phase velocity in the medium between the array and pilot source. To provide for retrodirectivity, the $i^{th}$ element in turn must transmit a signal which is the phase conjugate of the received signal of the form $$\phi_{ti}=\omega' t+\beta' r_i+\phi_0$$

where $\phi_0$ is an arbitrary phase offset and $\beta'=\omega'/v$. To maintain precise retrodirectivity it is necessary that the frequencies $\omega'$ of the transmitted signal $\phi_{ti}$ and $\omega$ of the pilot signal $\phi_{pi}$ be coherent and that the phase offset $\phi_0$ be identical for each of the array elements $E_i$.

Perhaps the best known phase conjugation technique is the heterodyne type proposed by Skolnik et al at pp. 142–149, IEEE Transactions on Antennas and Propagation Vol. AP-12, March 1964. The simplest of such circuits merely generates $2\omega t+\phi_0$ and substracts $\phi_{pi}$ in a mixer. Unfortunately, this simple technique cannot be realized with existing mixers due to their imperfect isolation. "Nearly" phase conjugating circuits, where the reference is slightly offset from $2\omega$ have been built.

Another type of phase conjugation circuit uses a phase locked loop. Like the simplest heterodyne circuit, this circuit is impractical since it requires near perfect mixer balance. There are many ways around this problem, but all lead either to more complicated circuits or, as in the case of the simplest heterodyne circuit, to imperfect conjugation.

A third kind of phase conjugation circuit uses servoed phase shifters to bring the received phase into agreement with a phase reference. The transmitted signal passes through the same phase shifter and phase conjugation results from reciprocity. This technique is disclosed by Margerum at pp. 341–407 of Microwave Scanning Antennas, Vol. 3, Array Systems, Academic Press, N.Y., 1966.

Margerum's example of this circuit also employs "central phasing." This means that all the phase conjugation circuits are located in an electrically compact "central phasing unit" rather than at their respective array elements. Each phase conjugation circuit is connected to its array element by a bilateral transmission line. This connection avoids the problem of distributing a uniform phase reference to each of the many phase conjugating circuits of a large array.

One difficulty with the simple radially structured central phasing approach described by Margerum is that the central phasing unit of a very large array of, say 10,000 elements, would be so large that phase reference distribution within the unit would be a difficult problem. More importantly, the problem of switching over to a back-up reference element and its associated central phasing unit, should the main one fail, has no simple solution in a radially structured system.

However, the central phasing technique is of interest because it points out the possibility of achieving an ARA array wherein the retrodirective property is independent of how the elements are arranged or aligned in the array. Also, the retrodirective property is not affected by the motion of the antenna elements relative to one another or of the pilot source. The pattern (gain, sidelobes, etc.) of the ARA is of course, determined by these geometrical factors just as it is for any array, but the retrodirective property is not. While the use of phase shifters as conjugating elements is impractical due to their weight and relatively high RF losses and central phasing itself has several disadvantages, independence of retrodirectivity from geometrical factors is a highly desirable objective.

If this objective can be achieved in a practical system, it should be possible to fabricate rather light and floppy arrays because such arrays would only have to be stiff enough to maintain the shape (i.e., gain, sidelobe levels, etc.) of the pattern within specified limits. The direction of the beam would not be affected by deformations of the array structure. However, this structural flexibility can be achieved only if the phase stability of the phase reference distribution system of the antenna array can be made independent of its dimensional stability. Otherwise, phase errors due to structural deformation will induce pointing errors in addition to pattern distortions.

The pointing error problem can be especially acute for very large arrays in space, such as the envisioned 1.0 km diameter array proposed for a synchronously orbiting solar power satellite. This antenna will be required to transmit S-Band power to a ground antenna array less than 10 km in diameter. The required pointing accuracy will be of the order of 200 m (or about one second of arc at synchronous altitude), which would, if conventional phasing techniques were used, require that the transmitting array dimensions be constant within about 6 parts per million. Thermal expansion cycling due to the daily rotation of the array would surely exceed this limit, even if the array were built of materials exhibiting the very lowest thermal expansion possible.

From the above discussion, the need for more effective phase conjugating techniques to facilitate ARA implementation is clear. None of the ARA schemes described in the prior art have provided a sufficiently accurate and practical method for generation or distribution of the necessary phase reference to a plurality of antenna array elements. Particularly, a means of providing a constant reference offset $\phi_0$ to a plurality of phase conjugation circuits, each of which is associated with a particular array element, has not been provided. Neither has this problem been particularly solved for the case of very large and distant antenna arrays described above.

SUMMARY OF THE INVENTION

It is therefore an object of the invention to provide a method and means for phasing the elements of retrodirective antenna arrays. More particularly, it is an object of the invention to provide for generation and distribution of a phase reference to conjugation circuitry associated with the elements of an ARA. It is yet another object of the invention to provide such a phase reference which is independent of phase delay between an antenna element and the phase reference source, as well as independent of relative movement between the antenna elements. Still another object of the invention is to provide a basic phase conjugation circuit for ARA's whose low mass and/or large dimensions preclude the use of conventional phasing techniques.

These and other objects and advantages of the invention are achieved according to the invention by a circuit, called an "elemental phase conjugation circuit" (EPCC), which is associated with each element of the array but one. The EPCC's are connected to one another in a chain or treelike fashion; i.e., except for the first or last circuits in the sequence, each circuit is connected to just one predecessor and to one or more successor circuits. The one element of the array which is not associated with an EPCC serves as a reference element. It provides the phase reference to the first EPCC and ultimately to all remaining elements of the array by regeneration at each EPCC.

Each EPCC receives a phase reference signal from its predecessor, uses that phase reference to conjugate the phase of the pilot signal received from a remote source by its associated array element, retransmits the conjugated signal by that same element, and regenerates the phase reference and passes it on to succeeding EPCC's. An important feature is that the regenerated phase reference is an accurate replica of the input phase reference regardless of the distance, or changes in distance, between widely separated parts of the EPCC, or between array elements associated with consecutive EPCC's.

The instant design not only provides the proper phase reference to each phase conjugation circuit but does so in such a way that the phase conjugation and phase reference distribution functions are combined in the basic circuit, and the accuracy and stability of each array element's phase reference is independent of the phase delay between that element and the reference source, or of changes in that phase delay due to relative movement between the elements.

BRIEF DESCRIPTION OF THE DRAWINGS

The preferred embodiment and best mode contemplated for implementing the just summarized invention will now be described in detail in conjunction with the drawings of which.

DESCRIPTION OF THE PREFERRED EMBODIMENT

Figure 1:
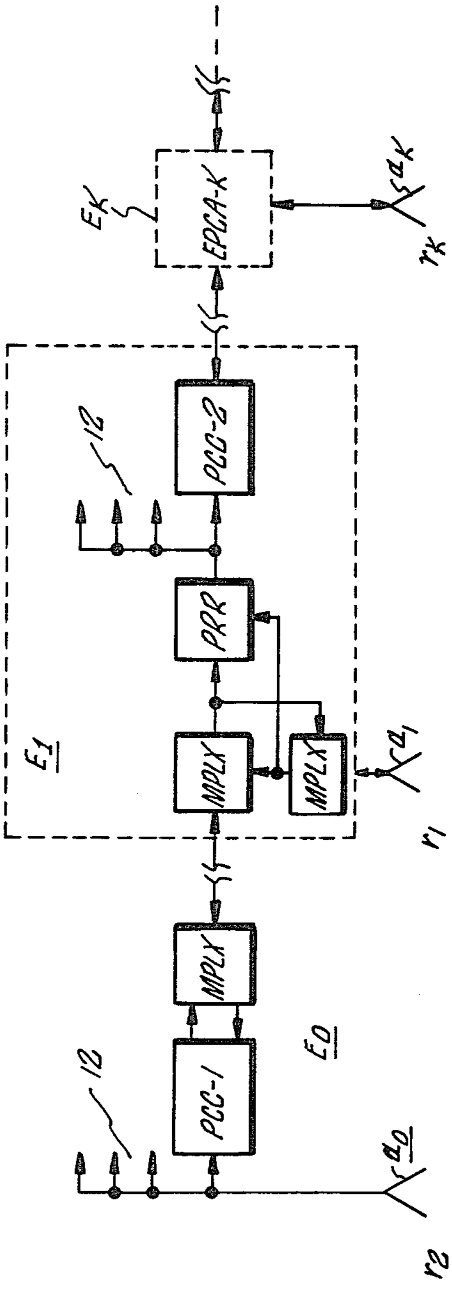
FIG. 1 illustrates the preferred embodiment of the invention in block form.

The preferred embodiment of the invention as applied to an antenna array of K elements is illustrated in block form in FIG. 1. The phase of the pilot signal received at time t by the Kth element of the array may be expressed as $\omega t-\beta r_K$ or alternatively $\omega(t-t_K)$, where $\omega$ is the radian frequency of the pilot signal and $t_k-r_k/v$, where $r_k$ is the distance from the pilot source to the Kth element, and v is the phase velocity in the intervening medium. Phase conjugation may be expressed as the operation:

$$\omega(t-t_k)\rightarrow\omega'(t+t_k)+\phi_0$$

where $\phi_0$ is constant for all K. In general, $\omega\neq\omega'$. A phase conjugation circuit PCC is associated with each element of the array to perform this operation.

The phase conjugation operation requires a phase reference. According to the preferred embodiment, the pilot signal received by one of the elements, called the reference element, is used to generate the phase reference. The phase conjugation circuit PCC-1 associated with the first antenna element $a_1$ is located at, i.e. is electrically close to, this reference element $a_0$. The phase conjugation circuit PCC-2 for the element $a_2$ is located at the first $a_1$, and so forth. Each phase conjugation circuit is connected to its associated element by a non-dispersive transmission line. The box $E_K$ labeled EPCA-K (elemental phase conjugation assembly) contains all the circuits located close to the Kth antenna element including the phase conjugation circuit for the (K+1)th element. Each assembly $E_0 \ldots E_K$ also contains such multiplexing apparatus MPLX as is necessary to couple signals into and out of the transmission lines and array elements. The operation of the functional blocks within each assembly $E_0 \ldots E_K$, will be explained presently.

By locating the phase conjugation circuit PCC-1 for the first element $a_1$ at the zeroth (reference) element $a_0$, the phase of the conjugated signal transmitted from the first element $a_1$ is independent of the phase delay of the transmission line between the first element $a_1$ and its phase conjugation circuit PCC-1. If the transmission line phase delay is $\phi_{10}=\omega t_{10}$, then the phase of the input of PCC-1 is $\omega(t-t_1-t_{10})$. Therefore, by our definition of phase conjugation above, the phase of the output of PCC-1 is $\omega'(t+t_1+t_{10})+\phi_{10}$. This signal is retransmitted down the same transmission line to element $a_1$. Since the line is non-dispersive, the retransmission phase delay exactly cancels the $+\omega' t_{10}$ term in the conjugated signal. Thus, the phase of the signal transmitted by the first element $a_1$ is $\omega'(t+t_1)+\phi_0$, which is exactly what it would be if the first phase conjugation circuit PCC-1 were located at the first element $a_1$ instead of the zeroth $a_0$ and supplied with the correct phase reference. The point of this arrangement is that if the first element's phase conjugation circuit PCC-1 were at the first element $a_1$, it would be necessary to transmit the phase reference $\phi_0$ to that phase conjugation circuit PCC-1 from the reference element $a_0$, so that phase conjugation would not be independent of the phase delay in the interconnecting transmission line.

Moving on to the second element $a_2$, in order for the phase conjugation circuit PCC-2 to conjugate the phase of the pilot signal received by the second element $a_2$ correctly, that phase conjugation circuit PCC-2 must be supplied with exactly the same phase reference as was the first element's phase conjugation circuit PCC-1. That phase reference is contained in the conjugate signal returned to the first element as the phase offset $\phi_0$. In order to extract this offset $\phi_0$, the conjugate signal is combined with the pilot signal in a "phase reference regenerator" (PRR) which, as shown in FIG. 1, supplies the phase reference to the phase conjugation circuit PCC-2 for the second element $a_2$. In the same way, the phase reference regenerator PRR at the second element $a_2$ supplies the phase reference to the third phase conjugation circuit PCC-3 and so on. Since each phase conjugation circuit receives the correct phase reference, it can conjugate the pilot signal received by its associated element correctly. Moreover, as in the case of the first element, the accuracy of phase conjugation at any element is independent of the phase delay of the transmission line between that element and its associated phase conjugation circuit.

In a two-dimensional array, the array elements would be connected in a tree configuration, rather than a chain, with the zeroth element as the trunk and with several branches issuing from each element $a_K$. The two-dimensional arrangement is indicated in FIG. 1 by the arrows 12 showing several phase conjugation circuits fed in parallel by each phase reference regenerator PRR. For a reasonable number of branches, the number of successive nodes required to connect all the elements of a large array is not large. For example, if there are six branches at each node, then a tree with six nodes connects 9,331 elements. The path from the reference element to any other element $a_K$ in this array intersects at most five phase conjugation circuits PCC-K's. Thus, assuming each PCC independently contributes a uniform RMS phase error $\sigma(\phi)$, then the RMS cumulative phase error is a modest $5\ \sigma(\phi)$.

Figure 2:
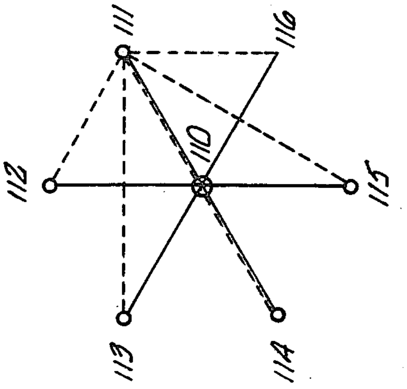
FIG. 2 is a schematic diagram illustrating a method for switching to a back-up reference element in the embodiment of FIG. 1.

Switching over to a back-up reference element, should the main one fail, has a rather simple solution in a tree structure, as shown by FIG. 2. This diagram shows a reference element 110 and six "1st order" elements, 111, 112, . . . , 116, each of which is served by a phase conjugation circuit at the reference element 110. Second and higher order elements are omitted from FIG. 2 for the sake of clarity. One of the elements 111 can serve as a back-up reference element if it is equipped with phase conjugation circuits for each of the five other first order elements, and if it is connected to them through five back-up transmission lines. In the event of a failure at the reference element 110, switches at the other elements 111–116 could connect those elements to their corresponding phase conjugation circuits at the back-up reference element 111. A similar scheme could be used to back-up a first order element with a second order element, and so on, as far into the tree as one wishes to go. The back-up capability provided in this manner would not greatly increase the total system cost.

Figure 3:
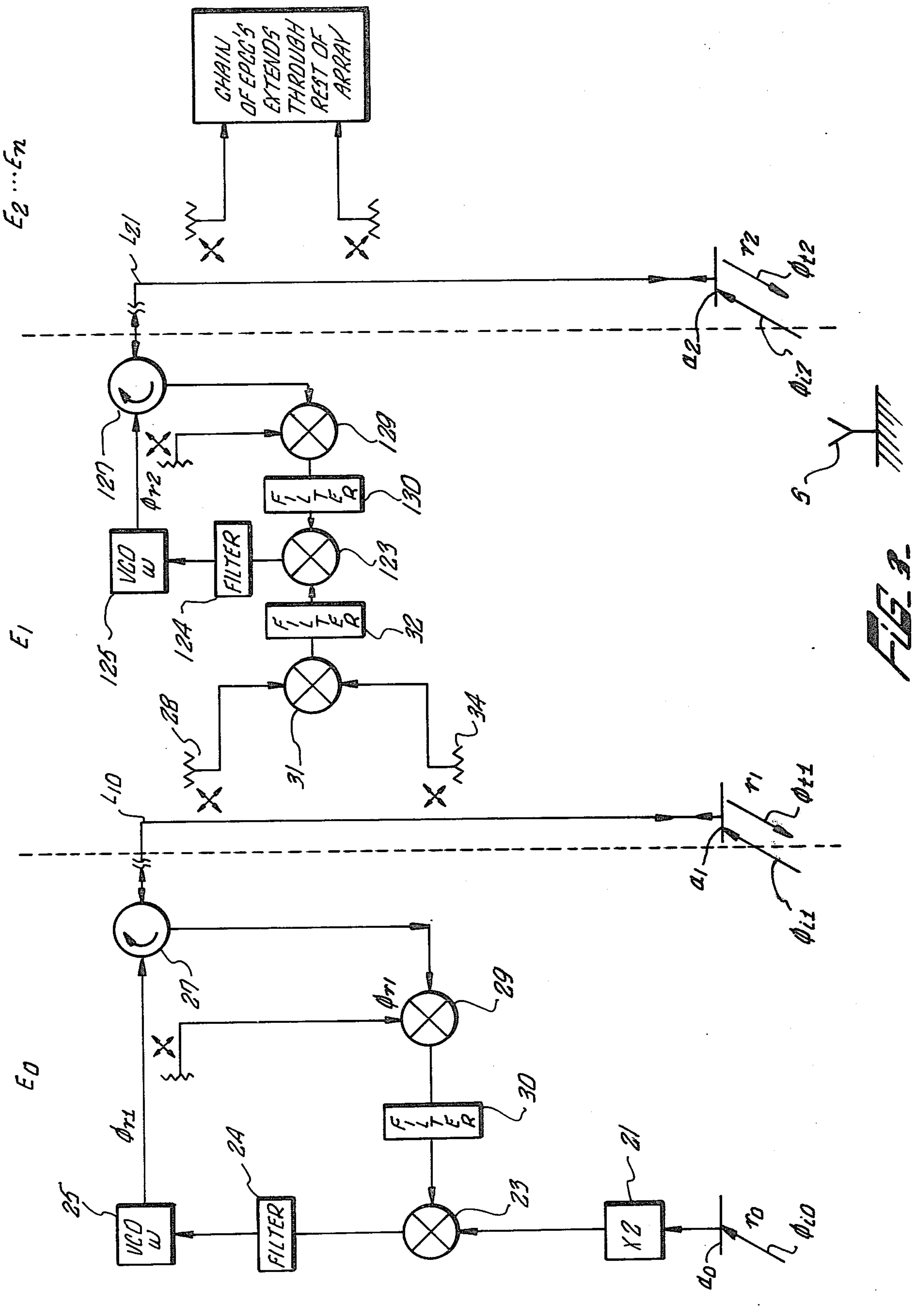
FIG. 3 is a schematic diagram of circuitry implementing the preferred embodiment of the invention.

Circuitry for implementing the preferred embodiment of FIG. 1 will now be discussed in more detail in conjunction with FIG. 3. As alluded to earlier in order to produce a retrodirective beam in an array antenna employing phase conjugation, it is necessary that the reference phase offset be identical at each array element. The circuitry of FIG. 3 provides uniform phase offset to each antenna element despite variations in physical distance between antenna elements and other phase delays. In addition, the frequency $\omega$ is locked to the input frequency of the received signal. The circuitry of FIG. 3 also combines phase reference stabilization and phase conjugation in a single circuit.

Three assemblies $E_0$, $E_1$, $E_2$ of an N-element ARA are shown in FIG. 3. The antenna elements $a_0$, $a_1$, $a_2$ of each respective assembly are at distances $r_0$, $r_1$, and $r_2$, respectively from a distant pilot signal source $S_2$. Elements $a_1$ and $a_2$, at distances $r_1$, $r_2$ respectively, are transmitting elements, while the element $a_0$ at $r_0$ is a reference element which receives a pilot signal $\phi_{i0}$. The reference assembly $E_0$ fed by the reference element $a_0$ generates the phase reference for all the transmitting assemblies $E_1, E_2 \ldots E_n$. These assemblies $E_1, E_2 \ldots E_n$ are assumed to be connected by fairly long transmission lines $L_{10}$, $L_{21}$, etc.

In examining the structure and operation of the embodiment of FIG. 3, it is instructive to consider first the structure and operation of the reference assembly, $E_0$. The reference assembly $E_0$ includes a frequency doubler 21, which receives the input pilot signal $\phi_{i0}$, doubles it and transfers the doubled frequency signal $\phi_{i0}$, doubles it and transfers the doubled frequency signal $2\phi_{i0}$ to a mixer 23, which functions as a phase detector. The phase detector 23 outputs through a filter 24 to a voltage controlled oscillator 25, operating at a frequency $\omega$. The output of the voltage controlled oscillator 25 is fed to a circulator 27. The circulator 27 is connected to a transmission line $L_{10}$ leading to the next assembly $E_1$ and also outputs to a second mixer 29. The second mixer 29 receives another input from the output $\phi r1$ of the voltage controlled oscillator 25 and supplies an output to the phase detector 23.

The reference assembly $E_0$ operates as follows. The pilot signal frequency is $\omega$ and its propagation constant in the medium between the pilot antenna and the ARA is $\beta$. At time t, each antenna element $a_0, a_1, \ldots a_n$ receives a pilot signal with phase $\omega t-\beta r_k$, where $r_k$ is the distance from the pilot source to the $k^{th}$ element. The pilot signal $\phi_{i0}=\omega t-\beta r_0$ received by the reference assembly $E_0$ is doubled by the frequency doubler 21, producing a phase $2\omega t-2\beta r_0$ at the input to the phase detector 23. The pilot signal $\phi_{i1}=\omega t-\beta r_1$ received by the first transmitting assembly $E_1$ is transmitted down the transmission line $L_{10}$ toward the reference assembly $E_0$. A phase shift $\beta_l L_{10}$ is subtracted from the phase of the pilot signal $\phi_{i1}$ such that the input signal to the circulator 27 from the transmission line $L_{10}$ is equal to $$\omega t-\beta r_1-\beta_t L_{10} \quad (1)$$

This signal is coupled out of the transmission line $L_{10}$ by the circulator 27 and is mixed with a sample of the VCO output $\phi_{r1}$ in the balanced mixer 29. The mixer 29 outputs to the bandpass filter 30 which feeds the upper sideband output of the mixer 29 to the phase detector 23. The phase detector 23 outputs to the low pass filter 24 which transmits only the dc component of the phase detector output to the VCO.

At time t, the output of the filter 30 to the phase detector 23 is equal to the sum of the phase of the VCO output, $\phi_{r1}$, and the phase of the pilot signal from the first assembly $E_1$ including the transmission line phase delay, $\beta_t L_{10}$, expressed as:

$$\phi_{r1}+\omega t-\beta r_1-\beta_t L_{10} \quad (2)$$

The other input to the phase detector 23 from the frequency doubler 21 is:

$$2\phi_{i0}=2\omega t-2\beta r_0 \quad (3)$$

If the voltage controlled oscillator 25 is in lock, the phases of the two inputs to the phase detector 23 must be equal. Equating expressions (2) and (3) and solving for the VCO output phase $\phi_{r1}$ gives:

$$\phi_{r1}=\omega t+\beta r_1+\beta_t L_{10}-2\beta r_0. \quad (4)$$

This signal $\phi_{r1}$ is then transmitted back to the first assembly $E_1$ by the transmission line $L_{10}$ and radiated by the antenna element $a_1$ as a transmitted phase $\phi_{t1}$. The transmitted phase $\phi_{t1}$ is given by the equation:

$$\phi_{t1}=\phi_{r1}-\beta_t L_{10}=\omega t+\beta r_1-2\beta r_0. \quad (5)$$

Equation (5) illustrates that the signal $\phi_{t1}$ transmitted by the first assembly $E_1$ is the phase conjugate of the received pilot signal $\phi_{i1}$ with a phase offset $-2\beta r_0$.

To make the antenna array retrodirective, it is now necessary to generate the identical phase offset $-2\beta r_0$ at each of the remaining transmitting assemblies $E_1$, $E_2$, . . . $E_n$. That the structure indicated for element $E_1$ will perform this function is evident from two facts.

First, except for the frequency doubler 21, the circuit to the right of the mixer 31 of the first assembly $E_1$ is identical to that at the reference assembly $E_0$. Second, the upper side band mixer 31 provides the same phase reference, $2\omega t-2\beta r_0$, to the phase detector 123 of the first assembly $E_1$ as the frequency doubler 21 provided to the corresponding phase detector 23 in the reference assembly $E_0$. The import of these facts will be explained in somewhat more detail in the following paragraphs describing the structure and operation of the first transmitting element $E_1$.

The first transmitting assembly $E_1$ includes a first mixer 123, a second mixer 129, a voltage controlled oscillator 125 and a circulator 127 interconnected identically to the corresponding components in the reference element $E_0$. The input to the circulator 127 is now supplied from the second transmitting array element $a_2$ in the second transmitting assembly $E_2$. The input to the phase detector mixer 123 is now the output of a mixer 31 which receives as inputs the pilot signal $\phi_{i1}$ and the transmitted signal $\phi_{t1}$ from respective directional couplers 28, 34. These signals, $\phi_{i1}$ and $\phi_{t1}$, are those respectively received and transmitted by the array element $a_1$ associated with the first transmitting assembly $E_1$. The upper side band output of the mixer 31, supplied by a suitable filter 32, is thus:

$$\phi_{i1}+\phi_{t1}=\omega t-\beta r_1+\omega t+\beta r_1-2\beta r_0=2\omega t-2\beta r_0. \quad (6)$$

Thus, the mixer 31 supplies the same input to the phase detector 123 of the first assembly $E_1$ as was supplied to the phase detector 23 in the reference assembly $E_0$ by the frequency doubler 21. Again in the first transmitting assembly $E_1$, the circulator 127 supplies the mixer 129 with the pilot signal input $\phi_{i2}$ to the second array element $a_2$ plus a phase delay $\beta L_{21}$ due to the transmission line $L_{21}$. The other input to the mixer 129 is again the output $\phi_{r2}$ of the VCO 125. Thus, the phase detector 123 is supplied with an input from the mixer 129 equal to:

$$\phi_{r2}+\omega t-\beta r_2-\beta_t L_{21} \quad (7)$$

Again solving for $\phi_{r2}$ as in the previous equations (2)-(4) yields:

$$\phi_{r2}=\omega t+\beta r_2+\beta_t L_{21}-2\beta r_0 \quad (8)$$

Transmitting $\phi_{r2}$ over the transmission line $L_{21}$ to the second antenna element $a_2$ yields a transmitted output signal $\phi_{t2}$ according to the following equation:

$$\phi_{t2}=\omega t+\beta r_2-2\beta r_0$$

Again, it is seen that the transmitted output signal $\phi_{t2}$ at the second array element $a_2$ is the phase conjugate of the input pilot signal $\phi_{i2}$ plus a phase offset $-2\beta r_0$. The important feature here is the phase offset $-2\beta r_0$ of the transmitted signal from the second array element $a_2$ is identical to the phase offset of the transmitted signal from the first array element $a_1$. By supplying samples of signal $\phi_{i2}$ and $\phi_{t2}$ to a second assembly $E_2$ constructed identically to the first assembly $E_1$, the transmitted output signal $\phi_{t3}$ of the third transmitting array element $a_3$ can similarly be made to be the phase conjugate of the pilot signal $\phi_{i3}$ inputted to that array element $a_3$ with a phase offset $-2\beta r_0$ again equal to that at the other transmitting array elements $a_1$, $a_2$. The chain of assemblies, $E_K$, is extended through the entire array.

Figure 4:
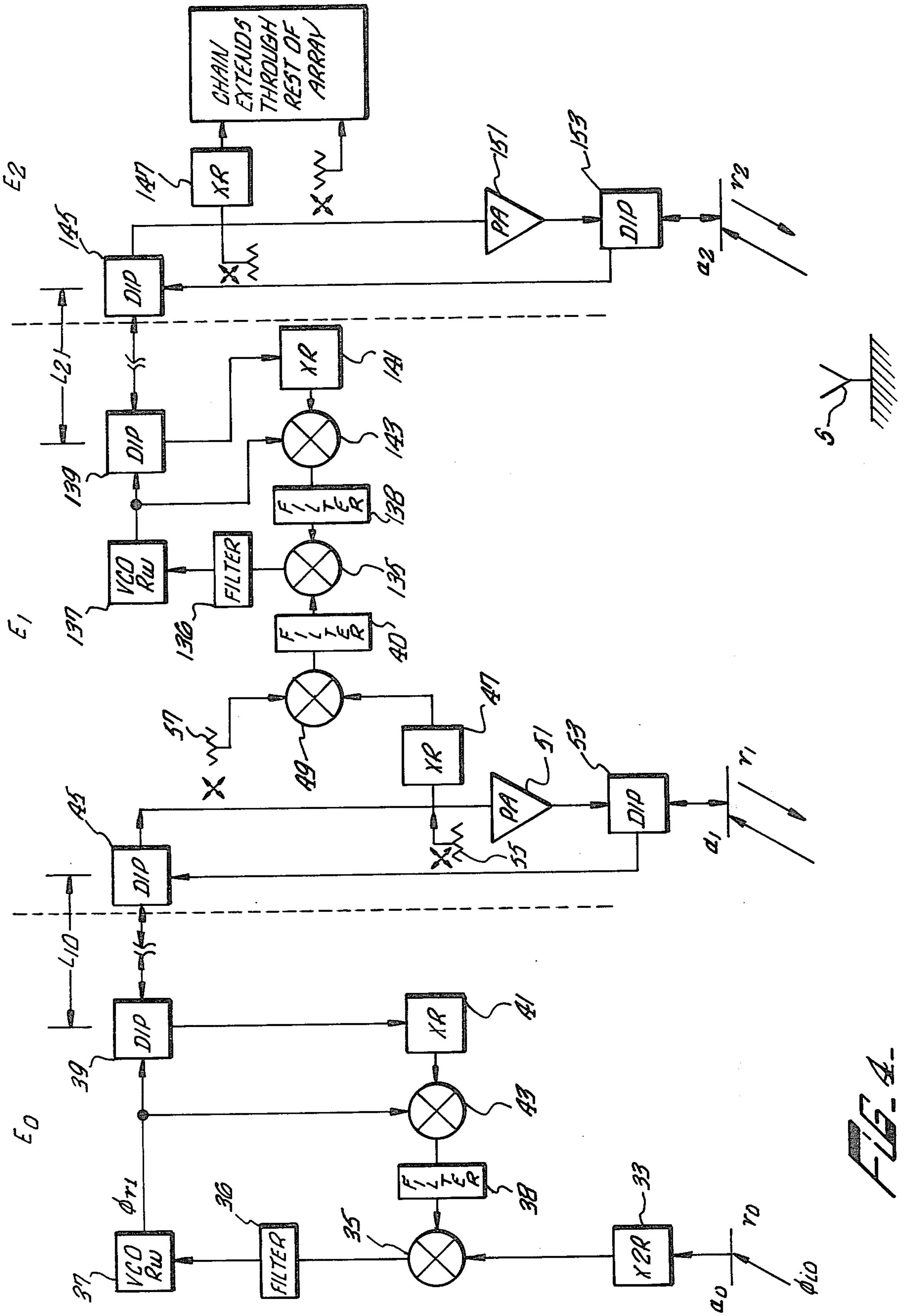
FIG. 4 is a schematic of circuitry implementing the preferred embodiment in a transponding antenna array.

The ARA just described in FIG. 3 uses the same frequency for both its pilot and transmitted frequencies. However, using identical frequencies will be impractical if the array is to provide a large power gain. Therefore FIG. 4 shows an alternate "transporting" version of the same array; the pilot signal is again at one frequency $\omega$ but the transmitted frequency is coherently shifted to another frequency $R\omega$. The transponding version of FIG. 3 again includes a reference assembly $E_0$ and several transmitting assemblies $E_1$, $E_2$, . . . $E_n$ inluding phase conjugation and regenerative circuitry.

The phase reference assembly $E_0$ of FIG. 4 includes several elements which function similarly to those of the reference assembly of FIG. 3. The pilot signal $\phi_{i0}$ from the reference antenna element $a_0$ is fed to a 2R multiplier 33 where R is the transponding ratio. The output of the multiplier 33 feeds a phase detector mixer 35 which outputs to a voltage controlled oscillator 37 through the low pass filter 36. The output $\phi_{r1}$ from the voltage controlled oscillator is fed to a diplexer 39, which receives a second input from the transmission line $L_{10}$ leading from the first transmitting assembly $E_1$.

The output of the diplexer 39 is fed to a times R frequency multiplier which outputs to a mixer 43. The mixer 43 receives a second input from the output $\phi_{r2}$ of the voltage controlled oscillator 37 and provides the second input to the phase detector 35.

The interface between the first assembly $E_1$ and the reference assembly $E_0$ is provided by a transmission line $L_{10}$ between the diplexer 39 in the reference assembly and a diplexer 45 in the first assembly $E_1$. This intermediate diplexer 45 receives the pilot signal $\phi_{i1}$ from an input/output diplexer 53, and transmits this pilot signal $\phi_{i1}$ across the transmission line $L_{10}$ to the reference circuit diplexer 39. The intermediate diplexer 45 also returns the reference circuit VCO output to a power amplifier 51 which supplies the input/output diplexer 53.

In operation the phase detector 35 of the reference assembly $E_0$ is fed with an input:

$$2R\omega t-2R\beta r_0 \quad (10)$$

from the multiplier 33 and with an input $$\phi_{r1}+r\omega t-R\beta r_1-R\beta_t L_{10} \quad (11)$$

from the mixer 43. Using the same analysis followed earlier in connection with Equations (2)-(4), the VCO output $\phi_{r1}$ is:

$$\phi_{r1}=R\omega t+R\beta r_1-2R\beta r_0+R\beta_t L_{10} \quad (12)$$

The VCO output signal $\phi_{r1}$ is then subjected to the phase delay of the transmission line segment $L_{10}$ and is amplified by a power amplifier 51 to produce the signal $\phi_{t1}$ transmitted from the first transmitting array element $r_1$:

$$\phi_{t1}=R\omega t+R\beta r_1-2R\beta r_0. \quad (13)$$

Two directional couplers 55, 57 are provided in the first transmitting assembly $E_1$ to sample the transmitted signal $\phi_{t1}$ and received (pilot) signal $\phi_{i1}$ close to the input and output ports, respectively, of the intermediate diplexer 45, rather than at the first array element $a_1$ as in the nontransponding ARA design of FIG. 3. The input coupler 55 feeds a times R frequency multiplier 47, and the output coupler 57 directly inputs to a mixer 49. The other input to the mixer 49 is the output of the times R multiplier 47. The mixer 49 provides one input to a phase detector mixer 35.

As in the reference assembly $E_0$, the phase detector 35 feed a voltage controlled oscillator 37 which outputs to a diplexer 39. This diplexer 39 is connected to the transmission line segment $L_{21}$ and provides an input to a times-R frequency multiplier 41. The output $\phi_{r2}$ of the voltage controlled oscillator 37 and the output of the time R multiplier 41 provides inputs to a mixer 43, which provides the second input to the phase detector 35. Thus, equations (10)-(12) with the appropriate subscripts changed are again satisfied, producing the proper phase conjugate form for $\phi_{t2}$.

Because the directional couplers 55, 57 are located close to the input and output ports of the intermediate diplexer 45 rather than at the first transmitting antenna element $a_1$, the sample phases differ somewhat from the actual received and transmitted phases and are accordingly denoted by $\phi'_{i1}$ and $\phi'_{t1}$ respectively. In the case of the received phase, the difference is the phase shift $\Delta\phi_{i1}$, in the short transmission line between the input/output and intermediate diplexers 53, 45. Therefore, $$\phi'_{i1}=\phi_{i1}-\Delta\phi_{i1}=\omega t-\beta r_1-\Delta\phi_{i1} \quad (14)$$

Applying this formula (14) for $\phi'_{i1}$ to the calculation of $\phi'_{t1}$ gives:

$$\phi'_{t1}=R\omega t=R\beta r_1+R\Delta\phi_{i1}-2R\beta r_0. \quad (15)$$

Therefore, the upper sideband output of the mixer 49 is:

$$\phi'_{t1}+R\phi'_{i1}=2R(\omega t-\beta r_0) \quad (16)$$

which is the correctly replicated phase reference. At the other side of the first transmitting assembly $E_1$, the intermediate diplexer 45 in the assembly $E_2$ is supplied with the pilot signal $\phi_{i2}$ by the second antenna element $a_2$. The phase detecting mixer 135, VCO 137, diplexer 139, multiplier 141 and mixer 143 then function as in the reference element $E_0$ to provide a transmitted output signal $\phi_{t2}$ at the second transmitting array element $a_2$:

$$\phi_{t2}=R\omega t+R\beta r_2-2R\beta r_0. \quad (17)$$

Again the transmitted signal $\phi_{t2}$ is the phase conjugate of the received pilot signal $\phi_{i2}$ with the addition of the uniform reference phase $-2R\beta r_0$. In addition, the transmitted output components $\phi_{t1}, \phi_{t2}, \ldots \phi_{tn}$ are amplified by power amplifiers 51 and are at a transponding frequency R.

Deriving the phase reference $2R\omega t-2R\beta_r 0$ from the input and output of the diplexer 45 proves to have an advantage over derivation of that phase reference from the actual received and transmitted signals such as $\phi_{t1}$ and $\phi_{i1}$. Since $\phi_{t1}=\phi'_{t1}-\phi_{PA}$, where $\phi_{PA}$ is the phase shift due to the power amplifer, the expression for the output of the mixer 49, assuming that the couplers provided signals $\phi_{t1}$ and $\phi_{i1}$ from the antenna, is:

$$\phi_{t1}+R\phi_{i1}=2R(\omega t-\beta r_0)+R\Delta\phi_{i1}-\phi_{PA}, \quad (18)$$

which is the same as Equation (16) except for the additional terms $R\Delta\phi_{i1}-\phi_{PA}$. Following this reasoning to the next element in the chain, one finds that these additional terms accumulate. This accumulation destroys the uniform phase reference condition for retrodirectivity. One could, of course, correct the phase error by contriving to have $\phi_{PA}\doteq R\Delta\phi_{i1}$ (mod $2\pi$) at each element of the array, but such a procedure is not as straightforward as the phase reference replication method of FIG. 3 where the directional couplers 55, 57 are placed close to the diplexer 45.

The phase shift of the power amplifiers 51 may still produce phase errors if $\phi_{PA}$ varies from element to element. Effects dependent upon hardware details (amplifier type, phase pushing, pulling, etc.) may be corrected by well-knonw phase stabilization measures (e.g., regulated power supplies).

Some design criteria may be noted with regard to the diplexers 39, 45, 53; 139, 145, 153. The input/output diplexer 53, 153 feeding each element is important in that its isolation must be high enough to prevent feedback in the power amplifier 51, 151. It must operate at high power levels, and its insertion loss must be low to preserve the overall efficiency of the array. The remaining diplexers 45, 39; 145, 139 are used to couple the forward (VCO output) and backward (pilot) signals $\phi_{rn}$ and $\phi_{in}$ into and out of the transmission lines. Since these diplexers operate at low power, insertion loss is less critical though isolation is still important. In some cases, high isolation circulators might be used instead of the remaining diplexers 45, 39; 145, 139. In any case, the construction and operation of such diplexers are well-known to those of ordinary skill in the art.

Additionally, the transponding ratio R can be any positive rational number, but it is customary to use ratios close to (but not too close to) unity in order to strike a balance between antenna bandwidth and diplexer isolation. Furthermore, if dispersion is encountered anywhere in the system, either in the array's circuitry or transmission lines, or in the medium between the array and the pilot source, then choosing R close to one will reduce "squint" (i.e., the pointing error due to systematic phase errors in phased arrays).

Figure 5:
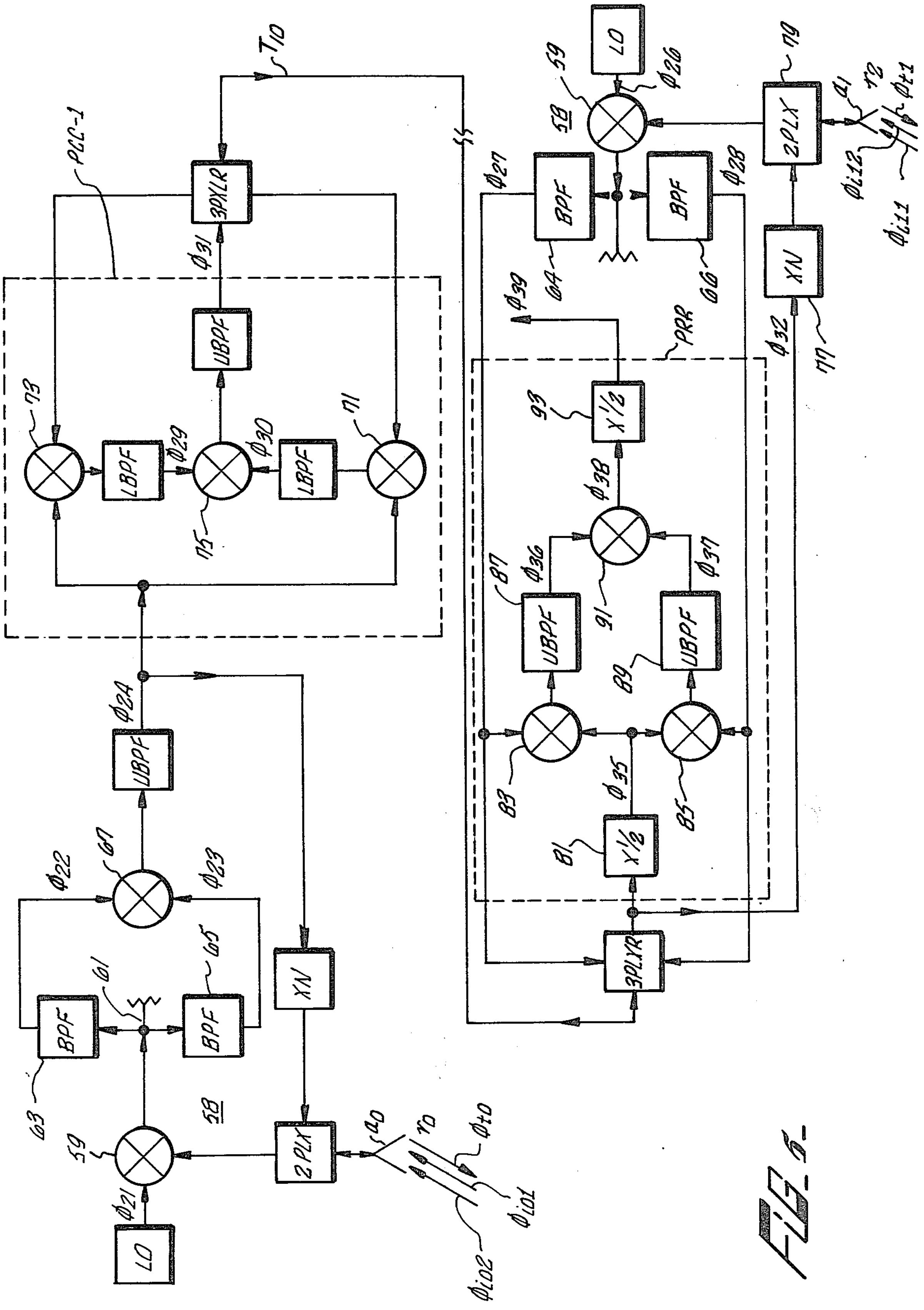
FIG. 5 is a schematic of circuitry particularly suited for implementing the preferred embodiment in connection with large microwave ARA's

FIG. 5 shows a phase conjugation scheme according to the preferred embodiment for an array particularly configured to satisfy several design criterion for a highly accurate, large microwave ARA. These design criterion are summarized in the following paragraphs.

First, it is desirable to perform phase conjugation at intermediate frequencies (IF) rather than at the incoming microwave frequency because the necessary components, if they exist at all at microwave frequencies, are much more expensive than at IF. Many IF components are available in integrated circuit form. In addition, transmission line losses are too large at microwave frequencies in a large array.

Conversion to IF by means of a simple receiver adds a local oscillator (LO) phase error to the phase information in the pilot signal. Therefore, the IF conversion requirement entails the corollary requirement that means must be incorporated in the system to remove or correct this phase error before the conjugated signal is transmitted.

A second criterion is that all signals in the transmission line between an element and its associated phase conjugation circuit must have different frequencies in order to insure isolation. For example, one cannot transmit the conjugate signal back down the transmission line to the element at the same frequency as the inbound pilot signal in the line because any reflections in the line will corrupt the phases of both signals. The alternative, which is to use separate transmission lines of inbound and outbound signals, is unsatisfactory because of the difficulty in matching phase delays in the separate lines.

As a third criterion, phase conjugation must be exact, not approximate, since even small phase errors will cause unacceptable pointing errors in a large array. This requirement rules out some of the simpler examples of phase conjugation circuits found in the prior art literature previously noted.

Finally, since the same antenna element must be used for both the pilot (received) and conjugate (transmitted) signals, these signals must have different frequencies in order to maintain isolation between input and output. This requirement, together with that of exact conjugation, implies that the conjugated IF signal be coherently multiplied up to the transmitted microwave frequency. One cannot, for example, simple offset the frequency of the conjugated signal from that of the pilot signal as is done in some previously proposed ARA's since this technique produces a beam pointing error known or "squint" by destroying the proportionality between frequency and phase shift.

The structure and operation of the receiving, phase conjugation and reference regeneration circuitry of FIG. 5 will now be described in detail. FIG. 5 shows a phase conjugation circuit (PCC) and a phase reference regeneration circuit (PRR) embedded in the reference element $E_0$ and the first transmitting element $E_1$ of an ARA. Each pilot signal receiver 58 includes a local oscillator (LO), a mixer 59, a power splitter 61 (hybrid) and two bandpass filters 63, 65. A pilot signal containing two microwave frequencies $f_1$ and $f_2$, $f_1 \neq f_2$, is used. Their difference, $f_1 - f_2$, is the basic reference and IF of the system, being in the VHF or UHF range. At each receiver, the frequency $f_{LK}$, K=0, 1, . . . n of the local oscillator LO satisfies:

$$f_2 < f_{LK} < f_1, \tag{18}$$

and $$f_{LK} \neq (f_1 + f_2)/2, \tag{19}$$

i.e., $f_{LK}$ is between, but not exactly halfway between, $f_1$ and $f_2$. As the K subscript indicates, the local oscillator frequencies need not be exactky equal although they should be very nearly equal (within about 0.01%) in order to insure that equations (18) and (19) are satisfied and in order to allow the use of uniform bandpass filters and other components.

Taking the receiver 58 at the reference element $E_0$ as an example, both microwave frequencies $f_1$ and $f_2$ mix with the local oscillator LO in the mixer 59 to produce the two unequal IF's $f_1 - f_{LO}$ and $f_{LO} - f_2$, which are extracted by the bandpass filters 63, 65 on each arm of the power splitter 61. When these unequal IF signals are added in the upconverter mixer 67 the local oscillator phase components in each cancel leaving just the reference signal represented by the difference in the microwave frequencies $f_1 - f_2$. The circuit operation up to this point may be summarized in equation form as follows:

$$\omega_1 = 2\pi f_1,\ \omega_2 = 2\pi f_2,\ \omega_L = 2\pi f_L \phi_{R01} = \omega_1(t - t_0), \phi_{R02} = \omega_2(t - t_0);\ t_0 = r_0/v \tag{20}$$

$$\phi_{21} = \omega_{LO} t + \phi_{LO} \tag{21}$$

$$\phi_{22} = (\omega_1 - \omega_{LO})t - \omega_1 t_0 - \phi_{LO} \tag{22}$$

$$\phi_{23} = (\omega_{LO} - \omega_2)t + \omega_2 t_0 + \phi_{LO} \tag{23}$$

$$\phi_{24} = (\omega_1 - \omega_2)(t - t_0) \tag{24}$$

The phases $\phi_{21}$ etc. correspond to those labeled at points on FIG. 5. Note that equation (19) insures exact phase addition in accordance with the previously mentioned requirements.

The reason equation (19) is important is that if $f_{LO} = (f_1 + f_2)/2$, then $\omega_1 - \omega_{LO} = \omega_{LO} - \omega_2$, i.e., the two inputs to the upconverter mixer 67 would be at the same frequency. This would cause inexact phase addition in this mixer 67 because its output phase would be corrupted by the phase of the second harmonic of the strong input (one of the inputs to a mixer has to be relatively strong in order to obtain non-linear operation of the device). Equation (24), therefore, would not hold exactly, and phase conjugation, which depends upon exact phase addition in the mixers 67 and 75, would not be exact as required by our third criterion. Equation (19) represents a key operational feature in that it assures that the second harmonics of the inputs to the mixer 67 are not at frequency $\omega_1 - \omega_2$ and can therefore be filtered out of the output of the mixer 67 by the upper sideband filter UBPF.

The same receiving process takes place at each other transmitting assembly $E_1 \ldots E_n$, but instead of being immediately recombined, the two IF signals ($f_1 - f_{LK}$ and $f_{LK} - f_2$) are coupled into a transission line $t_{10}$ and sent to the phase conjugation circuit PCC-K at the previous (K-1)th element. FIG. 5 shows this process in the first phase conjugation circuit PCC-1 for K=1, which is summarized in the following equations:

$$\phi_{i11} = \omega_1(t - t_1),\ \phi_{i12} = \omega_2(t - t_1);\ t_1 = r_1/v \quad (25)$$

$$\phi_{26} = \omega_{L1}t + \omega_{L1} \quad (26)$$

$$\phi_{27} = (\omega_1 - \omega_{L1})t - \omega_1 t_1 - \phi_{L1} \quad (27)$$

$$\phi_{28} = (\omega_{L1} - \omega_2)t + \omega_2 t_1 + \phi_{L1} \quad (28)$$

In the first phase conjugation circuit PCC-1 each of the two IF signals $f_1 - f_{L1}$ and $f_{L1} - f_2$ is mixed with the reference signal $\phi_{24}$ in down converter mixers 71 and 73, respectively. By virtue of equation 18, and taking into account transmission line delay $t_{10}$, the phases of the lower sideband outputs of these mixers 71, 73 are given by the following equations:

$$\phi_{29} = (\omega_{L1} - \omega_2)t + \omega_1(t_1 - t_0 + t_{10}) + \omega_2 t_0 - \omega_{L1}t_{10} + \phi_{L1} \quad (29)$$

$$\phi_{30} = (\omega_1 - \omega_{L1})t = \omega_2(t_1 - t_0 + t_{10}) - \omega_1 t_0 + \omega_{L1}t_{10} - \phi_{L1} \quad (30)$$

These two signals $\phi_{29}$, $\phi_{30}$ are added in an upconverter 75 to produce:

$$\phi_{31} = (\omega_1 - \omega_2)(t + t_1 - 2t_0 + t_{10}) \quad (31)$$

which is, except for the transmission phase delay $t_{10}$, the conjugate of the pilot signals received by the first element. This signal is sent back down the transmission line to the first transmitting assembly $E_1$, thus incurring phase delay $t_{10}$, which cancels out $t_{10}$ in equation (31) having:

$$\phi_{32} = (\omega_1 - \omega_2)(t + t_1 - 2t_0) \quad (32)$$

which is the exact conjugate of each of the pilot signals according to the definition of phase conjugation given above. This signal $\phi_{32}$ is multiplied by an integer N in a multiplier 77 to give the microwave signal which is coupled to the first antenna element $a_1$ by a diplexer 79 and transmitted. In accordance with design requirements for a large ARA previously discussed, N is chosen so that either:

$$N(f_1 - f_2) > f_1 \quad (33)$$

or $$N(f_1 - f_2) > f_2.$$

In considering the phase regeneration element PRR, it is first noted that if the signal transmitted by each element in the chain (or tree) is:

$$\phi(r_K) = N(\omega_1 - \omega_2)(t + t_K - 2t_0),\ K = 0, 1, \ldots, n, \quad (34)$$

then the array is retrodirective since equation (34) is the conjugate of the pilot signals received at the Kth element. From the previous paragraph and FIG. 5 it is apparent that equation (34) holds for K=0 and 1. Since all of the phase conjugation circuits in the array are identical, equation (34) will hold for any K if we supply each phase conjugation circuit with a phase reference $(\omega_1 - \omega_2)(t - t_0)$.

In order to supply this phase reference, it is necessary to regenerate the phase reference at each successive element from the first to the $(n-1)$th. This is done by the phase reference regenerator PRR.

The phase reference regeneration PRR for the first transmitting assembly $E_1$ is shown in FIG. 5. As there shown, the transmitted output phase $\phi_{32}$ is supplied to a times one-half multiplier 81, which supplies two mixers 83, 85. The other inputs to the mixers 83, 85 are the outputs $\phi_{27}$, $\phi_{28}$ of the receiver bandpass filters 64, 66, respectively. Each mixer 83, 85 outputs to an upper sideband bandpass filter 87, 89. The outputs of the filters 87, 89 are combined in mixer 91 whose output $\phi_{38}$ is fed to a times one-half frequency multiplier. Each of the mixers 83, 85, 91 are upconverters, i.e., phase adders, and the one-half multipliers 81, 93 are flip-flops. The operation of the phase reference regenerator PRR is summarized in the following phase equations, with reference to points on FIG. 5.

$$\phi_{35} = (\tfrac{1}{2})(\omega_1 - \omega_2)(t + t_1 - 2t_0) \quad (35)$$

$$\phi_{36} = (\tfrac{1}{2})(\omega_1 - \omega_2)(t + t_1 - 2t_0) + (\omega_1 - \omega_{L1})t - \omega_1 t_1 - - \phi_{L1} \quad (36)$$

$$\phi_{37} = (\tfrac{1}{2})(\omega_1 - \omega_2)(t + t_1 - 2t_0) + (\omega_{L1} - \omega_2)t + \omega_2 t_1 + - \phi_{L1} \quad (37)$$

$$\phi_{38} = 2(\omega_1 - \omega_2)(t - t_0) \quad (38)$$

$$\phi_{39} = (\omega_1 - \omega_2)(t - t_0) \quad (39)$$

Again Equation (19) is used here, as in the initial generation of the phase reference, for exact phase addition.

Figure 6:
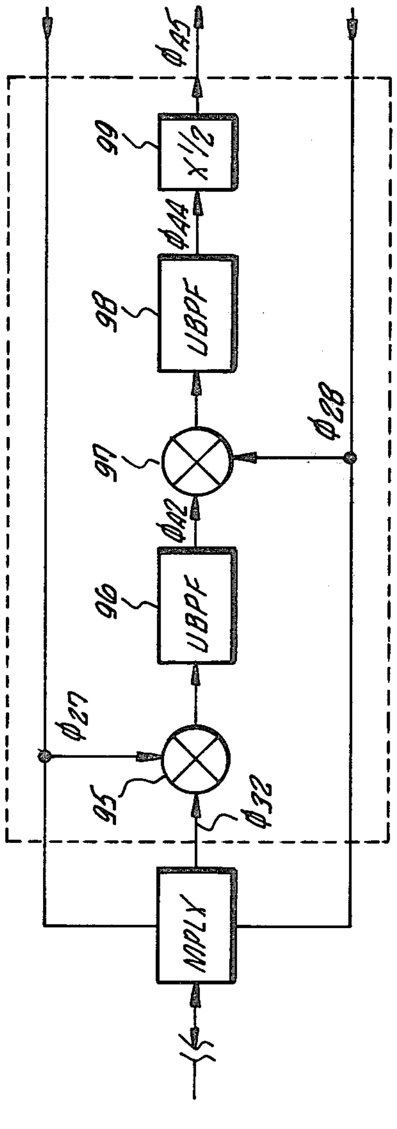
FIG. 6 is a schematic of an alternate phase regeneration circuit.

An alternative PRR design is shown in FIG. 6. It requires only two mixers 95, 97 and one flip-flop 99 as opposed to the three mixers and two flip-flops for the PRR in FIG. 5. Two filters 96, 98 are also employed. Due to its asymmetry, careful circuit layout is required to equalize internal phase delays.

The phases outputted at various points in this circuit (FIG. 6) are summarized as follows:

$$\phi_{32} = (\omega_1 - \omega_2)(t + t_1 - 2t_0) \quad (40)$$

$$\phi_{27} = (\omega_1 - \omega_{L1})t - \omega_1 t_1 - \phi_{L1} \quad (41)$$

$$\phi_{42} = (2\omega_1 - \omega_2 - \omega_{L1})t - (\omega_1 - \omega_2)(2t_0) - \omega_2 t_1 - \phi_{L1} \quad (42)$$

$$\phi_{28} = (\omega_{L1} - \omega_2)t + \omega_2 t_1 + \phi_{L1} \quad (43)$$

$$\phi_{44} = 2(\omega_1 - \omega_2)(t - t_0) \quad (44)$$

$$\phi_{45} = (\omega_1 - \omega_2)(t - t_0) \quad (45)$$

As may be noted, many modifications and adaptations may be made in the above described embodiments without departing from the spirit and scope of the invention. Therefore, it is to be understood that, within the scope of the appended claims, the invention may be practiced other than as specifically detailed above.

What is claimed is:

1. In an active retrodirective antenna array for directing a transmitted beam in the direction of an incident pilot signal, the combination comprising:

as least first and second antenna element means;

a first transmission line means exhibiting transmission line delay interconnecting said first and second antenna element means;

said first antenna element means including means receiving a transmitted signal from said second antenna element means across said transmission line means and operative on said transmitted signal and the incident pilot signal at said first antenna element means for generating a phase reference and the phase conjugate of the pilot signal inputted to said second antenna element means plus a transmission line delay.

2. The antenna array of claim 1 further including:

a third antenna element means;

a second transmission line means connecting said second antenna element means to said third antenna element means and further including means in said second antenna element means for regenerating said phase reference and for producing the phase conjugate of the pilot signal inputted to said third antenna element means plus a transmission line delay.

3. The antenna array of claim 2 wherein said means for generating a phase reference and the phase conjugate comprises:

a voltage-controlled oscillator; and means for operating on components of the input pilot signal at said second antenna element means, the input pilot signal to said first antenna element means, and the output of said voltage-controlled oscillator to produce a control signal such that when said voltage-controlled oscillator is in lock with said control signal, said voltage-controlled oscillator's output is the phase conjugate of the input pilot signal at said second element means plus a transmission line delay.

4. The antenna array of claim 3 wherein said means for operating includes:

means for multiplying the phase of the input pilot signal received by said first element, thereby producing a multiplied signal; and means for mixing and filtering the output of said voltage-controlled oscillator, the transmitted signal, and the multiplied signal to produce said control signal.

5. The antenna array of claim 4 wherein said mixing and filtering means comprises:

first mixer means for mixing said voltage-controlled oscillator output and said transmitted signal;

means for selecting the upper sideband phase component from the output of said first mixer means;

second mixer means for mixing said upper sideband phase component and said multiplied signal; and means for selecting the upper sideband component of said second mixer means for supply to said voltage-controlled oscillator.

6. The antenna array of claim 4 wherein the input pilot signal phase received by said first element means is multiplied by twice a transponding ratio and wherein said transmitted signal is multiplied by the transponding ratio before said mixing and filtering.

7. The antenna array of claim 6 wherein said first transmission line means returns the output of said voltage-controlled oscillator to said second element means, thereby producing an output signal and further including means for amplifying the said output signal.

8. The antenna array of claim 7 wherein said output signal and transmitted signal pass between a first multiplexing means interfacing with said first transmission line means, wherein said output signal is fed from said second multiplexing means to said means for amplifying, said means for amplifying then being connected to output to said first multiplexing means and wherein said output and transmitted signal are tapped near said first multiplexing means for supplying to said means for regenerating said phase reference and for producing the phase conjugate.

9. The antenna array of claim 3 wherein said means for regenerating said phase reference and producing the phase conjugate includes:

means for sampling the pilot signal at said second element means.

means for sampling the transmitted signal at said second element means; and means for mixing the samples of said pilot and transmitted signals to regenerate said reference.

10. The antenna array of claim 1 wherein said input pilot signal at each array element includes first and second phase components having first and second frequencies, respectively, and wherein said means for generating a phase reference and the phase conjugate comprises:

means for producing the difference of said first and second phase components of the pilot signal at said first antenna element means; and means for mixing said difference with phase components derived at said second antenna element means and transmitted across said first transmission line means to produce the phase conjugate of the input pilot signal received by said second element.

11. The antenna array of claim 10 wherein said difference producing means includes a local oscillator producing a local oscillator frequency, and wherein said local oscillator frequency is between but not exactly half-way between said first and second frequencies.

12. The antenna array of claim 11 wherein the difference of said first and second frequencies is in the IF range.

13. The antenna array of claim 11 wherein said difference producing means further includes:

means for mixing the local oscillator phase component and said first and second phase components;

means for filtering out of said mixing means a first receiver phase component equal to said first component minus said local oscillator phase component, and a second receiver component equal to said local oscillator phase component minus said second phase component; and means for producing said difference from said first and second receiver component frequencies.

14. The antenna array of claim 1 wherein each of said antenna element means receives a pilot signal containing first and second phase components having first and second frequencies respectively and has circuitry associated therewith comprising:

receiver means for mixing a local oscillator phase component with the first and second phase components received by the respective antenna element to produce first and second receiver phase components.

15. The antenna array of claim 14 wherein said first antenna element means has circuitry associated therewith comprising:

means for producing the difference of the first and second phase components at said first antenna element means; and first phase conjugation means for producing the phase conjugate of the input signal received by a second of said antenna element means from said difference and the first and second receiver phase components transmitted from said second antenna element means.

16. The antenna array of claim 15 wherein said second antenna element means has circuitry associated therewith comprising:

means for regenerating said difference from the first and second receiver phase components at said second element means and the phase conjugate of the input pilot signal at said second element means; and second phase conjugation means for producing the phase conjugate of the input pilot signal received by a third of said antenna element means from the regenerated difference supplied by said regenerating means and from the first and second receiver phase components received from said third element means.

17. The antenna array of claim 16 wherein said difference producing means comprises:

means for mixing said first and second phase components and filtering out said difference.

18. The antenna array of claim 16 wherein said first phase conjugation means comprises:

means for mixing said difference with said first and second phase components and filtering out third and fourth phase components; and means for mixing said third and fourth phase components and filtering out the phase conjugate of the input pilot signal at said second element means.

19. The antenna array of claim 16 wherein said second phase conjugation means comprises:

means for mixing said difference with the first and second phase components produced by the receiver means at said third element means and filtering out third and fourth components; and means for mixing said third and fourth components and filtering out the phase conjugate of the input pilot signal received by said third element means.

20. The antenna array of claim 16 wherein said regenerating means comprises:

means for dividing the phase conjugate signal received from said first phase conjugating means to produce a divided signal;

means for mixing said divided signal with the receiver phase components produced by the receiving means of said second element means and filtering out third and fourth phase components;

means for mixing said third and fourth phase components; and means for dividing the output of said means for mixing said third and fourth phase components to produce said difference.

21. The antenna array of claim 16 wherein said regenerating means comprises:

means for mixing said divided signal with the first receiver phase component produced by the receiver means at said second element means and filtering out a third phase component;

means for mixing said third phase component with the second receiver phase component produced by the receiver means at said second element means and filtering out a fourth phase component; and means for dividing said fourth phase component to produce said difference.

22. A method of phasing an active retrodirective antenna element array comprising the steps of:

generating a phase reference from the pilot signal received at a first of said elements;

transmitting the pilot signal received by a second of said elements to said first element;

producing the phase conjugate of the pilot signal received by said second element at said first element from said phase reference and the pilot signal transmitted from said second element;

transmitting said phase conjugate back to said second element;

regenerating said phase reference at said second element from the pilot and transmitted signals at said second element; and producing the phase conjugate for the third element at said second element from the regenerated phase reference and the input pilot signal transmitted from said third element.

23. In an active retrodirective antenna array for directing a transmitted beam in the direction of an incident pilot signal, the combination comprising:

a plurality of antenna elements;

means for generating a phase reference and the phase conjugate of the pilot signal inputted to a second of said antenna elements, said means including;

a voltage-controlled oscillator; and means for operating on components of the input pilot signal at said second antenna element, the input pilot signal to said first antenna element, and the output of said voltage-controlled oscillator to produce a control signal such that when said voltage-controlled oscillator is in lock with said control signal, said voltage-controlled oscillator's output includes the phase conjugate of the input pilot signal at said second element.

24. In an active retrodirective antenna array for directing a transmitted beam in the direction of an incident pilot signal containing first and second phase components and having first and second frequencies respectively, the combination comprising:

a plurality of antenna elements; and means associated with a first of said antenna elements for generating a phase reference and the phase conjugate of the pilot signal inputted to a second of said antenna elements, said means including receiver means for mixing a local oscillator phase component with the first and second phase components received by the respective antenna elements to produce first and second receiver phase components.

* * * * *